(12) United States Patent
Harada

(10) Patent No.: US 10,241,660 B2
(45) Date of Patent: Mar. 26, 2019

(54) DISPLAY CONTROL APPARATUS, METHOD FOR CONTROLLING THE SAME, AND STORAGE MEDIUM

(71) Applicant: CANON KABUSHIKI KAISHA, Tokyo (JP)

(72) Inventor: Sayaka Harada, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 147 days.

(21) Appl. No.: 15/245,071

(22) Filed: Aug. 23, 2016

(65) Prior Publication Data

US 2016/0364125 A1   Dec. 15, 2016

Related U.S. Application Data

(63) Continuation of application No. 14/025,647, filed on Sep. 12, 2013, now Pat. No. 9,449,584.

(30) Foreign Application Priority Data

Sep. 14, 2012   (JP) ................. 2012-203006

(51) Int. Cl.
*G06F 3/0484* (2013.01)
*G06T 3/40* (2006.01)
*G09G 5/00* (2006.01)
*G09G 5/373* (2006.01)
*H04N 5/76* (2006.01)
*G06F 3/0488* (2013.01)
*H04N 5/262* (2006.01)

(52) U.S. Cl.
CPC ...... *G06F 3/04845* (2013.01); *G06F 3/04883* (2013.01); *G06T 3/40* (2013.01); *G09G 5/373* (2013.01); *H04N 5/2628* (2013.01); *H04N 5/76* (2013.01); *G06F 2203/04808* (2013.01)

(58) Field of Classification Search
CPC ....... G06F 2203/04808; G06F 3/04845; G06F 3/04883; G06T 3/40; G09G 5/373; H04N 5/2628; H04N 5/76
See application file for complete search history.

(56) References Cited

U.S. PATENT DOCUMENTS

2010/0199214 A1* 8/2010 Mikawa ................ G06F 3/0481
                                                      715/800
2012/0127358 A1* 5/2012 Furukawa .......... H04N 5/23293
                                                      348/333.12

* cited by examiner

*Primary Examiner* — Sing-Wai Wu
(74) *Attorney, Agent, or Firm* — Canon U.S.A., Inc. IP Division

(57) ABSTRACT

A display control apparatus performs, when an image is switched to another image while remaining enlarged, display not giving an uncomfortable feeling to a user, and performs control, when a first image enlarged and displayed on a display unit is switched into a second image, to zoom and display, out of a display magnification of the second image based on magnification information used in the first image before the switching and stored, and of a fit magnification for making the second image have a size falling within a display area in the display unit to match the display area, the second image at a magnification that is the fit magnification or more when the display magnification based on the magnification information is smaller, and the second image at the display magnification based on the magnification information when the display magnification based on the magnification information is larger.

15 Claims, 8 Drawing Sheets

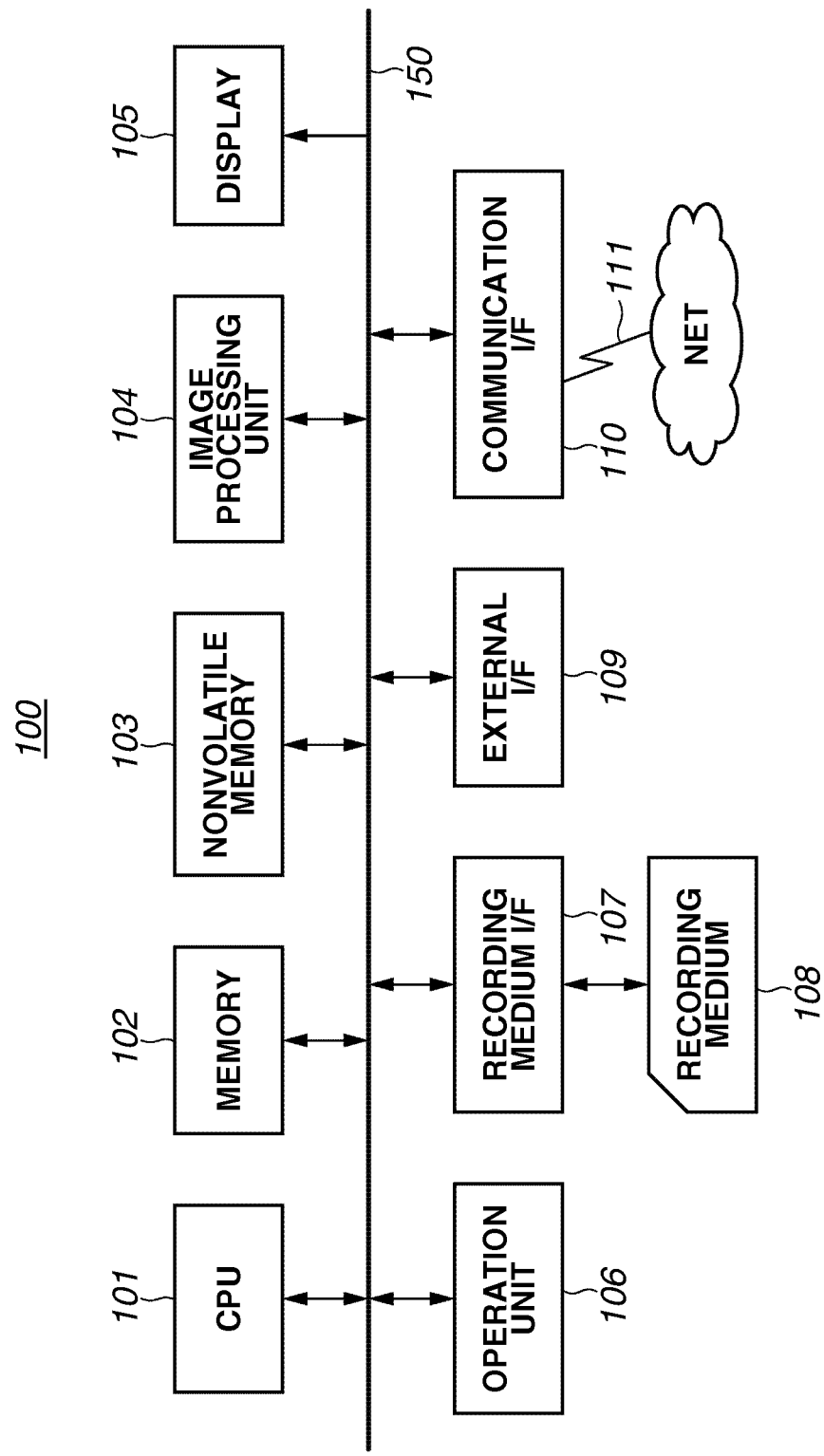

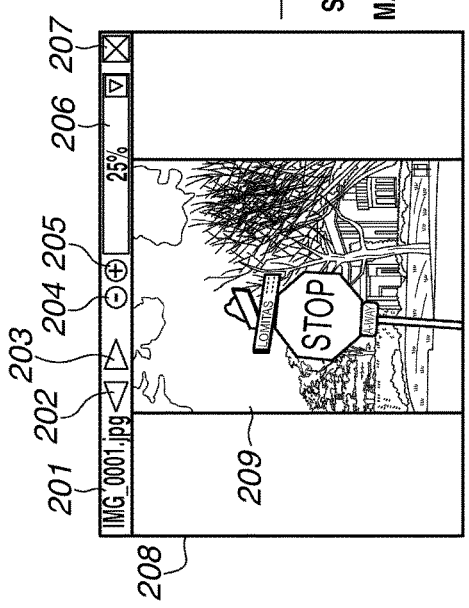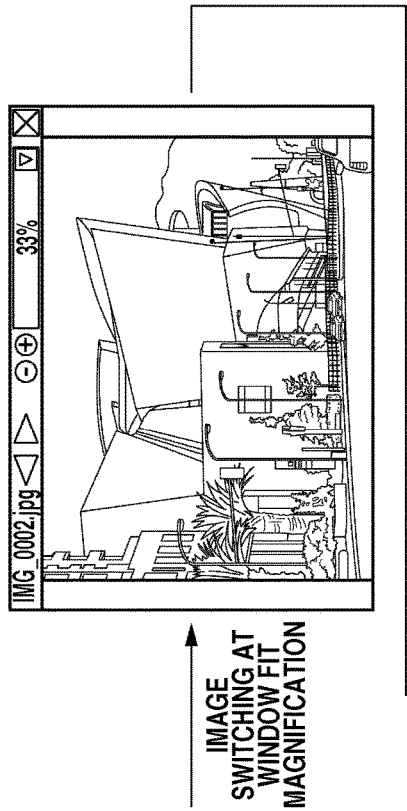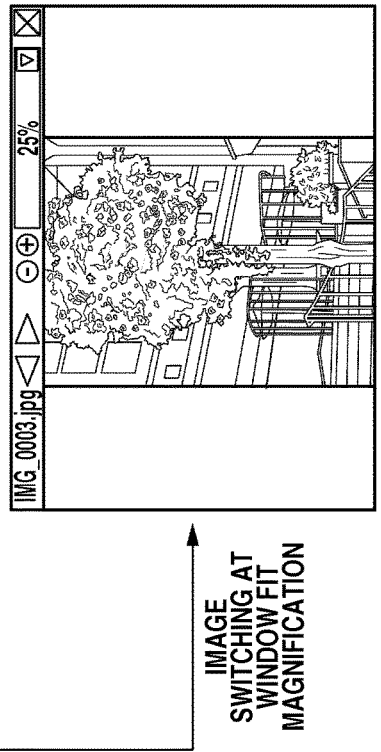

FIG.4A

| STEP | DEFINITION OF MAGNIFICATION RATIO FROM REFERENCE MAGNIFICATION |
|---|---|
| 0 | X (WINDOW FIT MAGNIFICATION) |
| 1 | 1.2 |
| 2 | 2.0 |
| 3 | 2.9 |
| 4 | 4.1 |
| 5 | 4.9 |
| 6 | 5.9 |
| 7 | 6.9 |
| 8 | 8.0 |
| 9 | 8.9 |
| 10 | 9.9 |

FIG.4B

| MAGNIFICATION RATIO FROM ORIGINAL IMAGE | MAGNIFICATION RATIO FROM REFERENCE MAGNIFICATION (= MAGNIFICATION RATIO FROM ORIGINAL IMAGE/ REFERENCE MAGNIFICATION) |
|---|---|
| 25% | 0.75 |
| 30% | 0.9 |
| 33% | 1 |
| 40% | 1.2 |
| 55% | 1.65 |

# DISPLAY CONTROL APPARATUS, METHOD FOR CONTROLLING THE SAME, AND STORAGE MEDIUM

CROSS-REFERENCE TO RELATED APPLICATIONS

This application is a Continuation, and claims the benefit, of U.S. patent application Ser. No. 14/025,647 filed Sep. 12, 2013 (which issued as U.S. Pat. No. 9,449,584 on Sep. 20, 2016), which claims the benefit of Japanese Patent Application No. 2012-203006 filed Sep. 14, 2012. Each of U.S. patent application Ser. No. 14/025,647 and Japanese Patent Application No. 2012-203006 is hereby incorporated by reference herein in its entirety.

BACKGROUND OF THE INVENTION

Field of the Invention

The present invention relates to a display control apparatus capable of sequentially enlarging and displaying a plurality of images, a method for controlling the display control apparatus, and a storage medium.

Description of the Related Art

Japanese Patent Application Laid-Open No. 2004-260715 discusses an image display apparatus having a function of retaining an enlargement rate and an enlargement position and switching a displayed image into another image (so-called image switching) to confirm a focusing state at the same position and perform precise confirmation in a plurality of images.

When image switching is performed while an enlargement rate is retained, like in a conventional technique discussed in Japanese Patent Application Laid-Open No. 2004-260715, described above, the following problems occur.

An image is only enlarged and displayed more slightly than while displayed in a length or width matching the length or width of a display area (at a window fit magnification) so that a display direction of the image is correct and the entire image falls within the display area. If image switching is performed by retaining an enlargement rate in another image having a different aspect rate from that of the preceding image from the state, the enlargement rate retained from the preceding image may be smaller than a window fit magnification in the other image.

When the other image is displayed at the enlargement rate retained from the preceding image in such a case, the other image is displayed to be smaller in both the length and the width than the display area. Therefore, a user feels as if the image were more reduced than the preceding image before the image switching, although the image switching is performed while the enlargement rate is retained.

SUMMARY OF THE INVENTION

The present invention is directed to a display control apparatus capable of performing display not giving an uncomfortable feeling to a user when an image is switched to another image while remaining enlarged.

According to an aspect of the present invention, a display control apparatus includes a magnification change unit configured to change a display magnification of an image displayed on a display unit based on an operation performed by a user, a storage unit configured to store magnification information representing the display magnification of the image that has been changed by the magnification change unit, a receiving unit configured to receive a switching instruction to switch an image displayed on the display unit to another image, and a display control unit configured to be responsive to receiving of a switching instruction to switch a first image to a second image by the receiving unit for performing control to display the second image at a magnification that is a fit magnification or more when a display magnification based on the magnification information stored in the storage unit is smaller than the fit magnification and to display the second image at the display magnification based on the magnification information when the display magnification based on the magnification information is larger than the fit magnification, wherein the fit magnification is magnification for making the second image have a size falling within a display area in the display unit to match the display area.

According to the present invention, display not giving an uncomfortable feeling to a user can be performed when an image is switched to another image while remaining enlarged.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a block diagram illustrating a configuration of a display control apparatus according to the present exemplary embodiment.

FIGS. 2A to 2C illustrate examples of display in single image switching in the present exemplary embodiment.

FIG. 4A is a correspondence table of each of zooming steps and a magnification ratio from a reference magnification in the present exemplary embodiment.

FIG. 4B illustrates a correspondence between a magnification ratio from the original image and a magnification ratio from a reference magnification in the present exemplary embodiment.

DESCRIPTION OF THE EMBODIMENTS

Figure 3B:
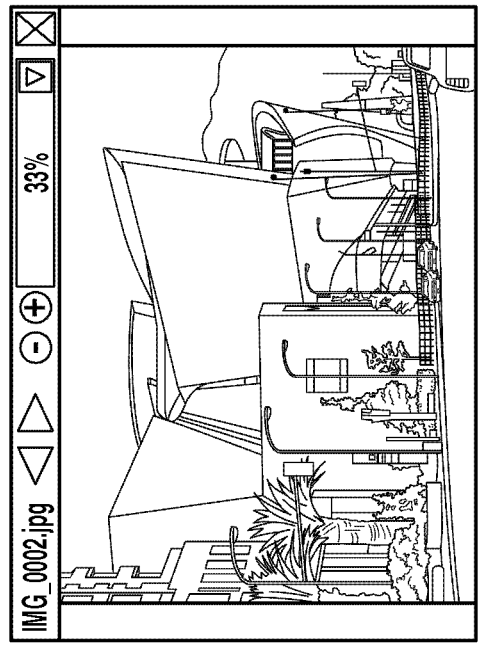
FIGS. 3A and 3B are conceptual diagrams illustrating a reference magnification in the present exemplary embodiment.

An exemplary embodiment of the present invention will be described in detail below with reference to the accompanying drawings.

It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

FIG. 1 illustrates an example of a configuration of a display control apparatus 100 to which the present invention is applicable. The display control apparatus 100 can be configured using a personal computer (hereinafter referred to as a PC) or the like.

In FIG. 1, a central processing unit (CPU) 101, a memory 102, a nonvolatile memory 103, an image processing unit 104, a display 105, an operation unit 106, a recording medium interface (I/F) 107, an external I/F 109, and a communication I/F 110 are connected to an internal bus 150. Each of the units connected to the internal bus 150 can exchange data to one another via the internal bus 150.

The memory 102 includes a random access memory (RAM) (a volatile memory using a semiconductor device), for example. The CPU 101 controls each of the units in the display control apparatus 100 using the memory 102 as a work memory according to a program stored in the nonvolatile memory 103, for example. The nonvolatile memory 103 stores image data and audio data, other data, and various types of programs for causing the CPU 101 to operate. The nonvolatile memory 103 includes a hard disk (HD) and a read-only memory (ROM), for example.

The image processing unit 104 subjects image data stored in the nonvolatile memory 103 and a recording medium 108, a video signal acquired via the external I/F 109, and image data acquired via the communication I/F 110 to various types of image processing based on the control performed by the CPU 101. The image processing performed by the image processing unit 104 includes analog-to-digital (A/D) conversion processing, digital-to-analog (D/A) conversion processing, image data coding processing, compression processing, decoding processing, enlargement/reduction processing (resizing), noise reduction processing, and color conversion processing. The image processing unit 104 may include a dedicated circuit block for performing specific image processing. The CPU 101 can also perform image processing according to a program without using the image processing unit 104 depending on the type of image processing.

The display 105 displays an image and a GUI screen constituting a graphical user interface (GUI) based on the control performed by the CPU 101. The CPU 101 controls each of the units in the display control apparatus 100 to generate a display control signal according to the program, to generate a video signal to be displayed on the display 105 and to output the generated video signal on the display 105. The display 105 displays a video based on the output video signal. The display control apparatus 100 itself only includes a configuration up to and including an interface for outputting a video signal for displaying the video on the display 105, and the display 105 may include an external monitor (e.g., a television (TV) set).

The operation unit 106 is an input device for receiving a user operation including a character information input device such as a keyboard, a pointing device such as a mouse or a touch panel, a button, a dial, a joystick, a touch sensor, and a touch pad. The touch panel is an input device configured in a planar shape by being overlaid on the display 105 and configured so that coordinate information corresponding to a contacted position is output.

The recording medium I/F 107 is configured so that the recording medium 108 such as a memory card, a compact disk (CD), or a digital versatile disk (DVD) can be mounted thereon, and reads and writes data out of and into the mounted recording medium 108 based on the control performed by the CPU 101.

The external I/F 109 is an interface connected to an external device with a wired cable or no wires for inputting/outputting a video signal and an audio signal. The communication I/F 110 is an interface for communicating with the external device and the Internet 111, and for sending and receiving various types of data such as a file and a command.

If the operation unit 106 includes the touch panel, the CPU 101 can detect an operation and a state, described below, for the touch panel.

The touch panel is touched with a finger or a pen (hereinafter referred to as Touch-Down).

The touch panel is being touched with a finger or a pen (hereinafter referred to as Touch-On).

A finger or a pen is moving while the touch panel is being touched therewith (hereinafter referred to as Touch-Move).

A finger or a pen with which the touch panel is being touched is released (hereinafter referred to as Touch-Up).

The touch panel is touched with nothing (hereinafter referred to as Touch-Off).

The operations or the states and touch position coordinates at which the touch panel is being touched with the finger or the pen are notified to the CPU 101 via the internal bus 150, and the CPU 101 determines what operation has been performed for the touch panel based on the notified information.

For Touch-Move, a movement direction of the finger or the pen, which moves on the touch panel, can be determined for each vertical component/horizontal component on the touch panel based on a change in position coordinates.

When Touch-Up has been performed via constant Touch-Move from Touch-Down on the touch panel, a stroke is drawn. An operation for quickly drawing the stroke is referred to as a flick. The flick is an operation for quickly moving the finger by a certain distance while the touch panel is being touched with the finger and releasing the finger, i.e., an operation for quickly tracing the touch panel to flick the touch panel with the finger.

When Touch-Move has been detected to be performed at a predetermined speed or more by a predetermined distance or more and Touch-Up has been directly detected, it can be determined that a flick has been performed.

When Touch-Move has been detected to be performed at less than a predetermined speed by a predetermined distance or more, it is determined that a drag has been performed.

A simultaneous touch (a multi-touch) at two points for the touch panel can also be detected to be being performed. It can also be determined that Touch-Move is being performed so that a distance between touch positions at touched two points decreases while the two points of the touch panel are touched with the finger or the pen using detection of the multi-touch (hereinafter referred to as a pinch-in).

It can also be determined that the finger or the pen is moving so that the distance between the touched two points increases while the two points of the touch panel are touched with the finger or the pen (hereinafter referred to as a pinch-out). The pinch-in and the pinch-out are generically referred to as a pinch.

The touch panel may be of any one of various types such as a resistance film type, a capacitance type, a surface acoustic wave type, an infrared type, an electromagnetic induction type, an image recognition type, and an optical sensor type.

FIGS. 2A, 2B, and 2C illustrate examples of display in single image switching in the display 105.

In FIGS. 2A, 2B, and 2C, examples of display of an image 1 (a first image), an image 2 (a second image), and an image 3 (a third image), as described below, will be described.

<Image 1>
File name: IMG_0001.jpg
Original image size: 3000 pixels in width×4000 pixels in length
More specifically, the image 1 is a vertically long image having an aspect ratio of 3:4.

<Image 2>
File name: IMG_0002.jpg
Original image size: 4000 pixels in width×3000 pixels in length
More specifically, the image 2 is a horizontally long image having an aspect ratio of 4:3.

<Image 3>
File name: IMG_0003.jpg
Original image size: 3000 pixels in width×4000 pixels in length
More specifically, the image 3 is a vertically long image having an aspect ratio of 3:4

FIG. 2A illustrates an example of display in a single display mode in the display 105 of the image 1. In the single display mode, an image is displayed at a window fit magnification. The window fit magnification is, when an image is displayed in a display area in a correct display direction (i.e., in a vertical direction if it is the image 1), a display magnification in the maximum size within which the entire image falls. In other words, the window fit magnification is the smaller one of a magnification ratio at which the length of the original image matches the length of the display area and a magnification ratio at which the width of the original image matches the width of the display area.

In FIG. 2A, an area 201 is an area where a file name of a displayed image is displayed.

An image return button 202 is an operation icon for receiving a switching instruction to switch an image to be displayed into a preceding image in a predetermined order (e.g., in the order of file names) in image switching. A user can switch the displayed image into the preceding image by a touch operation for the image return button 202 and a click operation with the mouse.

An image switching button 203 is an operation icon for receiving a switching instruction to switch an image to be displayed into a succeeding image in a predetermined order (e.g., in the order of file names) in image switching. The user can switch the displayed image into the succeeding image by a touch operation or a click operation with the mouse for the image switching button 203.

A reduction button 204 is an operation receiving icon for receiving an instruction to gradually reduce the displayed image out of a plurality of predetermined magnifications. The user can further reduce the displayed image by a touch operation or a click operation with the mouse for the reduction button 204.

An enlargement button 205 is an operation receiving icon for receiving an instruction to gradually enlarge the displayed image out of a plurality of predetermined magnifications. When the operation for the reduction button 204 or the enlargement button 205 is performed so that the display magnification of the displayed image is changed, the display of a display magnification display area 206 is also updated in synchronization therewith.

The display magnification display area 206 is an area where the display magnification of the currently displayed image is to be displayed. The display magnification to be displayed in the display magnification display area 206 is represented by a magnification ratio from the original image. If the image 1 the original image of which is 3000 pixels in width×4000 pixels in length is reduced to 750 pixels in width×1000 pixels in length to match the display area when displayed, for example, 25% (0.25) serving as the magnification ratio from the original image is displayed.

When a pull-down button displayed at the right of the display magnification display area 206 is operated, options representing magnification ratios are displayed in a pull-down menu. When any one of the options representing the magnification ratios displayed in the pull-down menu is selected, the displayed image is enlarged or reduced at the magnification ratio represented by the option.

An end button 207 is an operation icon for receiving an instruction to end the display of the image. When the end button 207 is clicked with a touch or a mouse operation, a window in which the image is displayed is closed, and the display of the image ends.

A display area 208 is an area where the image is to be displayed in the window. While the display area 208 is 1500 pixels in width×1000 pixels in length in the present exemplary embodiment, the size of the display area 208 can be changed by a user operation. The display area 208 is a part of the display 105 when the image is displayed, like in the window. However, the display area 208 may be a full screen to match a displayable range of the display 105.

In reduction or enlargement by the operation for the reduction button 204 and the enlargement button 205, zooming is performed up to a magnification ratio in any one of 10 steps defined by a magnification ratio from a reference magnification. The reference magnification in the present exemplary embodiment is a magnification ratio obtained when an image has been zoomed so that the size of the long side of the image and the size of the long side of the display area 208 match each other regardless of whether the image is vertically long or horizontally long.

The concept of a reference magnification in the present exemplary embodiment will be described with reference to FIGS. 3A and 3B.

Figure 3A:
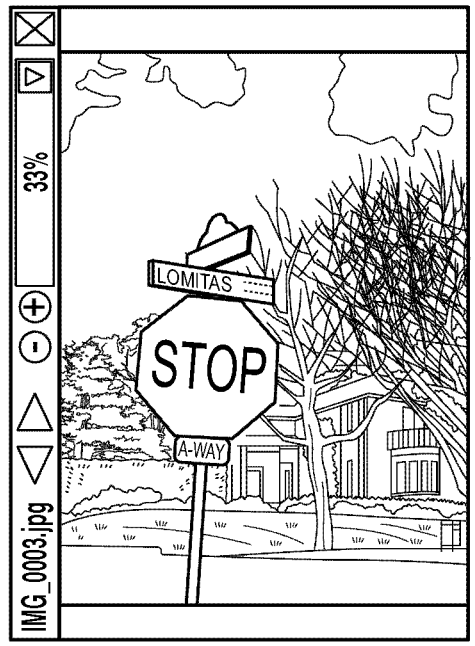

FIG. 3A illustrates an example of display performed when the vertical side serving as the long side of the image 1 and the horizontal side serving as the long side of the display area 208 match each other. A reference magnification of the image 1 is 33% (0.33) serving as a magnification for making the long side (the vertical side; 4000 pixels) of the image 1 and the long side (the horizontal side; 1500 pixels) of the display area 208 match each other. To actually perform such display, the image 1 needs to be rotated by 90 degrees.

FIG. 3B illustrates an example of display performed when the horizontal side serving as the long side of the image 2 and the horizontal side serving as the long side of the display area 208 match each other. A reference magnification of the image 2 is 33% (0.33) serving as a magnification for making the long side (the horizontal side; 4000 pixels) of the image 2 and the long side (the horizontal side; 1500 pixels) of the display area 208 match each other.

FIG. 4A illustrates a correspondence table of 10 steps into which an enlargement rate is divided in the present exemplary embodiment and a magnification ratio from a reference magnification defined in each of the steps.

The magnification ratio in step 0 is a magnification for displaying an image at a window fit magnification and is a variable that differs depending on the image. The magnification ratios in step 1 and the subsequent steps are respectively defined as fixed values for the reference magnification.

The magnification ratio in step 1 is set so that any image becomes larger than the image zoomed at the reference magnification when zoomed using the magnification ratio in step 1. In other words, the magnification ratio in step 1 is larger than one. More specifically, if the image is displayed at the window fit magnification, the displayed image is enlarged to a size larger than a size of the image zoomed at the reference magnification at which the long side thereof matches the long side of the display area 208 when the enlargement button 205 is pressed once. The magnification ratio from the original size of the image and the magnification ratio from the reference magnification satisfy the following relationship:

the magnification ratio from the original size of the image=the reference magnification×the magnification ratio from the reference magnification.

Therefore, at a reference magnification of 0.33, for example, an image obtained by multiplying an original image by 0.25 is equal to an image obtained by multiplying the original image by the reference magnification of 0.33 and further multiplying the multiplied original image by 0.75. More specifically, if the magnification ratio from the original image is 25% (a value displayed in the display magnification display area 206), the magnification ratio from the reference magnification is 0.75.

Similarly, to easily grasp a relationship between magnification ratios in each of examples of display illustrated in FIGS. 5 and 6, described below, a correspondence table of a magnification ratio from an original image at a reference magnification ratio of 0.33 and a magnification ratio from a reference magnification is illustrated in FIG. 4B. However, a correspondence differs depending on the reference magnification. This shall not apply to an image not having a reference magnification of 0.33.

The CPU 101 reduces, when a magnification ratio smaller than the current magnification ratio and closest thereto is defined in any one of the ten steps, the displayed image to the magnification ratio in the step every time an operation for the reduction button 204 is performed once. More specifically, a zoomed image having a magnification ratio from a reference magnification defined in "the size of an original image×a reference magnification×a step" is displayed.

On the other hand, the CPU 101 enlarges, when a magnification ratio larger than the current magnification ratio and closest thereto is defined in any one of the ten steps, the displayed image to the magnification ratio in the step every time an operation for the enlargement button 205 is performed once. More specifically, a zoomed image having a magnification ratio from a reference magnification defined in "the size of an original image×a reference magnification×a step" is displayed.

The image can also be reduced/enlarged by performing a pinch-in/pinch-out operation for the display area 208. The image is reduced when the pinch-in operation is performed, and is enlarged when the pinch-out operation is performed. In the pinch-in/pinch-out operation, a magnification ratio is determined depending on a distance between touched two points, and can be set in a finer unit than the magnification ratio defined in each of the above-mentioned ten steps.

A magnification ratio corresponding to the operations for the reduction button 204 and the enlargement button 205 is defined by not a magnification ratio from a window fit magnification but a magnification ratio from a reference magnification for the following reason.

Suppose an image captured by a camera. In a horizontally long image and a vertically long image respectively obtained by capturing an object while the camera is horizontally held and vertically held at entirely the same distance from the object, the display size of the object in the vertically long image becomes smaller than that in the horizontally long image when the images are displayed at a window fit magnification for a horizontally long display area. This is because the window fit magnification differs between the horizontally long image and the vertically long image.

The display sizes of the object in the horizontally long image and the vertically long image hardly need to be the same if the images are displayed at the window fit magnification for the purpose of confirming the entire images. However, if a plurality of images is enlarged, and the same object is confirmed by comparing its display sizes in the plurality of images that remains enlarged, the display sizes of the same object captured at the same distance are more easily compared when they are the same. Therefore, a magnification ratio for each step is defined at the magnification ratio from the reference magnification so that the display sizes of the same object captured at the same distance are the same in the horizontally long image and the vertically long image when the images are enlarged at a magnification ratio defined in the same step.

If the plurality of images obtained by capturing the same object at the same distance differs in the number of recording pixels, although having the same aspect ratio, the display sizes of the same object in the plurality of images differ even if the images are displayed while magnification ratios from their original images are made the same. On the other hand, the display sizes of the same object in the plurality of images can be the same if the images are displayed while magnification ratios from the reference magnification are made the same. Therefore, the plurality of images is easily compared.

In the display control apparatus 100 according to the present exemplary embodiment, when an instruction to reproduce and display an image is issued, the image is first displayed at a window fit magnification in a single display mode as initial display. When the image switching button 203 is pressed (touched or clicked) while the image 1 is displayed in the single display mode, the succeeding image 2 is displayed in the single display mode (FIG. 2B). Since image switching is performed in the single display mode, the image 2 is displayed at a magnification ratio of 33% serving as a window fit magnification. More specifically, the magnification ratio differs from that at which the image 1 is displayed.

When the image switching button 203 is further pressed, image switching in the single display mode is further performed, and the image 3 is displayed at a window fit magnification of 25% (FIG. 2C). Image switching (or image return) in the single display mode, as illustrated in FIGS. 2A to 2C, is referred to as single image switching.

Figure 5C:
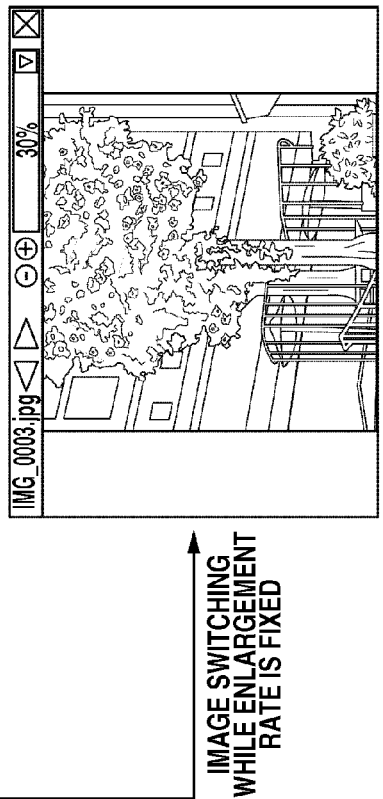
FIGS. 5A to 5C illustrate examples of display performed when image switching retaining a conventional enlargement rate, to which the present invention is not applied, is performed.
Figure 5B:
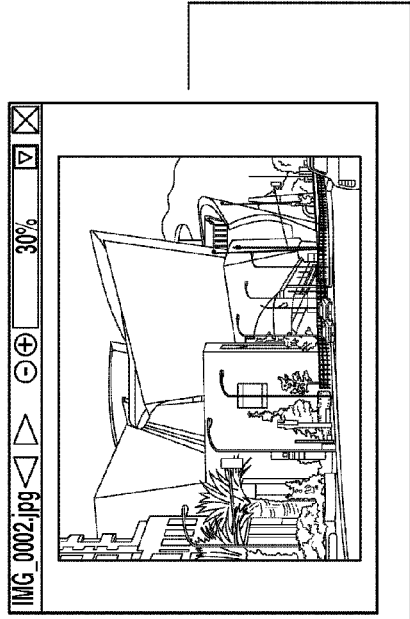
Figure 5A:
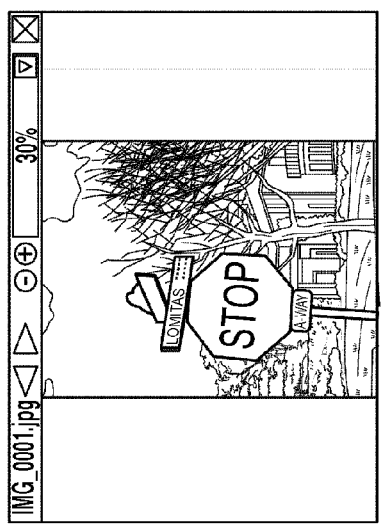

FIGS. 5A, 5B, and 5C illustrate examples of display in conventional enlarged image switching to which the present invention is not applied. When an image is more enlarged than that displayed at a window fit magnification in a single display mode, the single display mode is shifted to an enlargement display mode. When an image switching or image return operation is performed in the enlargement display mode, enlarged image switching is performed.

FIG. 5A illustrates an example of display performed when the image 1 is slightly enlarged by a pinch-out operation from the state illustrated in FIG. 2A, and is displayed at a magnification ratio of 30%. The image 1 is more enlarged than that displayed at the window fit magnification in the single display mode illustrated in FIG. 2A, and is displayed in the enlargement display mode.

In this state, if the enlargement rate (magnification ratio) of 30% (a magnification ratio of 0.9 from a reference magnification) is retained when the image switching button 203 is pressed to perform image switching, the image 2 is displayed at the magnification ratio of 30%, as illustrated in FIG. 5B.

However, the image 2 is displayed to be smaller than that displayed at the window fit magnification when displayed at the magnification ratio of 30%. The image 2 is displayed while margins occur along the length and the width of the display area 208. More specifically, the image 2 is displayed to be smaller than that illustrated in FIG. 2B which is displayed in single image switching, although the image switching in the enlargement display mode is performed.

Thus, the user may misunderstand that the image 2 has been reduced and have an uncomfortable feeling, although the image switching in the enlargement display mode is performed.

When the image switching button 203 is further pressed from the state illustrated in FIG. 5B, image switching is further performed. The image 3 is displayed, as illustrated in FIG. 5C, when displayed while the enlargement rate (magnification ratio) of 30% is retained.

In the image 3, the magnification ratio of 30% is larger than the window fit magnification. Therefore, the length of the image 3 cannot fall within a range in a vertical direction of the display area 208, and a part of the image 3 is displayed. Therefore, the user can see that the image 3 is more enlarged than that displayed at the window fit magnification and displayed. Thus, the user cannot understand an alignment with the display of the image 2 (FIG. 5B) in which margins occur, and may have an uncomfortable feeling.

On the other hand, FIGS. 6A, 6B, 6C, 6D, and 6E illustrate examples of display performed in enlarged image switching to which the present invention is applied.

Figure 6C:
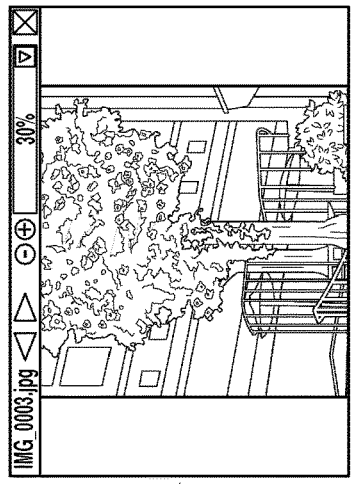
FIGS. 6A to 6E illustrate examples of display in enlarged image switching to which the present invention is applied.
Figure 6E:
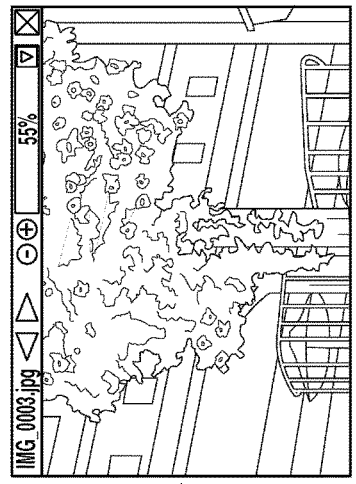
Figure 6B:
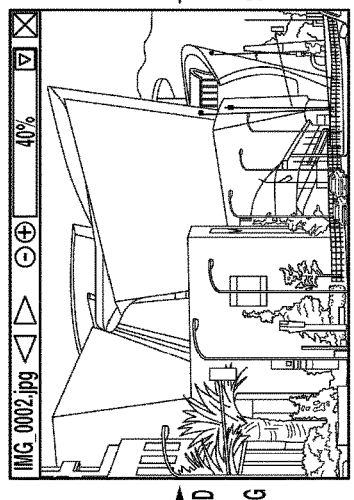
Figure 6D:
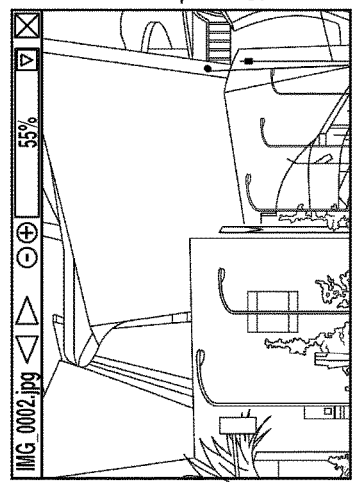
Figure 6A:
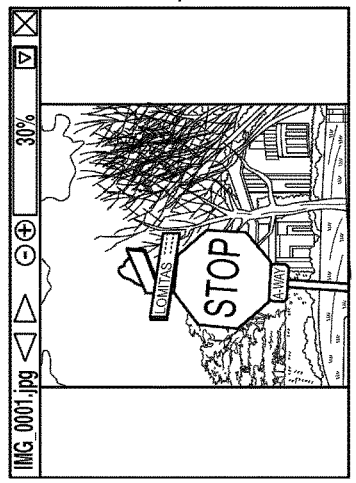

A display state illustrated in FIG. 6A is similar to that illustrated in FIG. 5A, and is slightly enlarged from that in the single display mode of the image 1 illustrated in FIG. 2A.

When the image switching button 203 is pressed from this state, the image 2 is displayed at a display magnification of 40% (a magnification ratio of 1.2 from a reference magnification) larger than a window fit magnification (a reference magnification×1.0), as illustrated in FIG. 6B.

The image 2 becomes smaller than that displayed at the window fit magnification when the magnification ratio of 30% (an enlargement rate of 0.9 from a reference magnification) in the image 1 is applied thereto. Therefore, in the present exemplary embodiment, if an image is smaller than that displayed at the window fit magnification when displayed at an enlargement rate taken over from the preceding image in performing image switching in an enlargement display mode, only the image is displayed at not the enlargement rate of the preceding image but a magnification ratio that is the window fit magnification or more of the image.

Thus, the user can see that the image 2 is displayed in a more slightly enlarged state than the image 2 in the single display mode illustrated in FIG. 2B, and does not have an uncomfortable feeling in the image switching in the enlargement display mode.

When the image switching button 203 is further pressed from the state illustrated in FIG. 6B, the image 3 is displayed at a magnification ratio of 30% (a magnification ratio of 0.9 from a reference magnification), which is the same as that at which the image 1 is displayed, as illustrated in FIG. 6C.

Thus, processing for making the magnification ratio in the image 2 differ from the magnification ratio in the image 1 is exceptional. Basically, a magnification ratio (a magnification ratio of 0.9 from a reference magnification) in the image 1 at the time point where the enlarged image switching starts is retained (i.e., is applied to an image after the image switching).

If the user performs an enlargement/reduction operation from the state illustrated in FIG. 6B, the magnification ratio retained in the image switching in the enlargement display mode is updated. More specifically, the image 2 is further enlarged by the pinch-out operation from the state illustrated in FIG. 6B, and is displayed as illustrated in FIG. 6D.

When the image switching button 203 is pressed from the state, the image 3 is zoomed at not the magnification ratio used in the image 1 but a magnification ratio of 55% in the image 2 (a magnification ratio of 1.65 from a reference magnification), and is displayed as illustrated in FIG. 6E.

Figure 7:
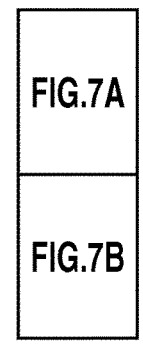
FIG. 7, composed of FIG. 7A and FIG. 7B, is a flowchart of enlargement display processing in the present exemplary embodiment.
Figure 7A:
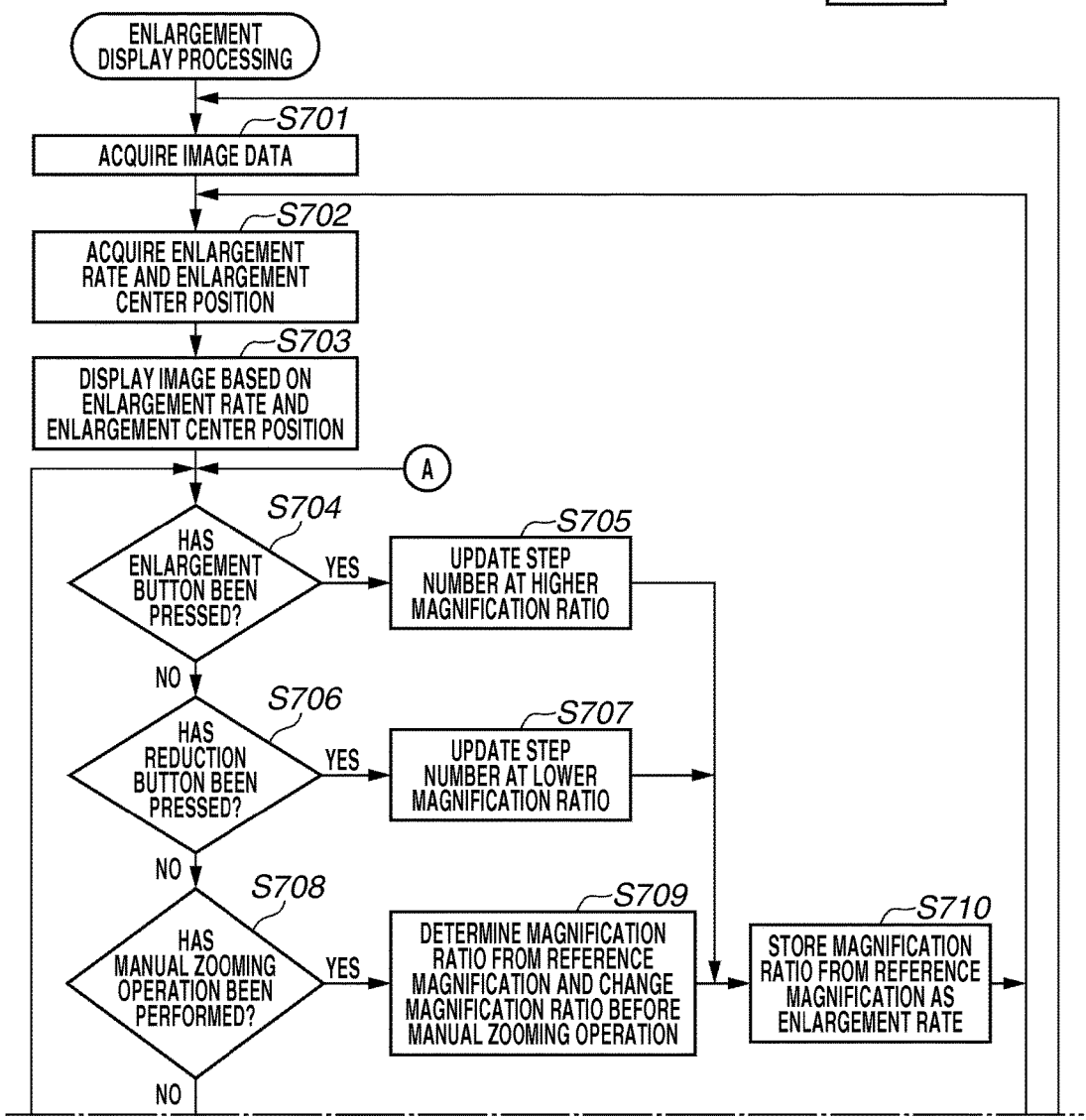
Figure 7B:
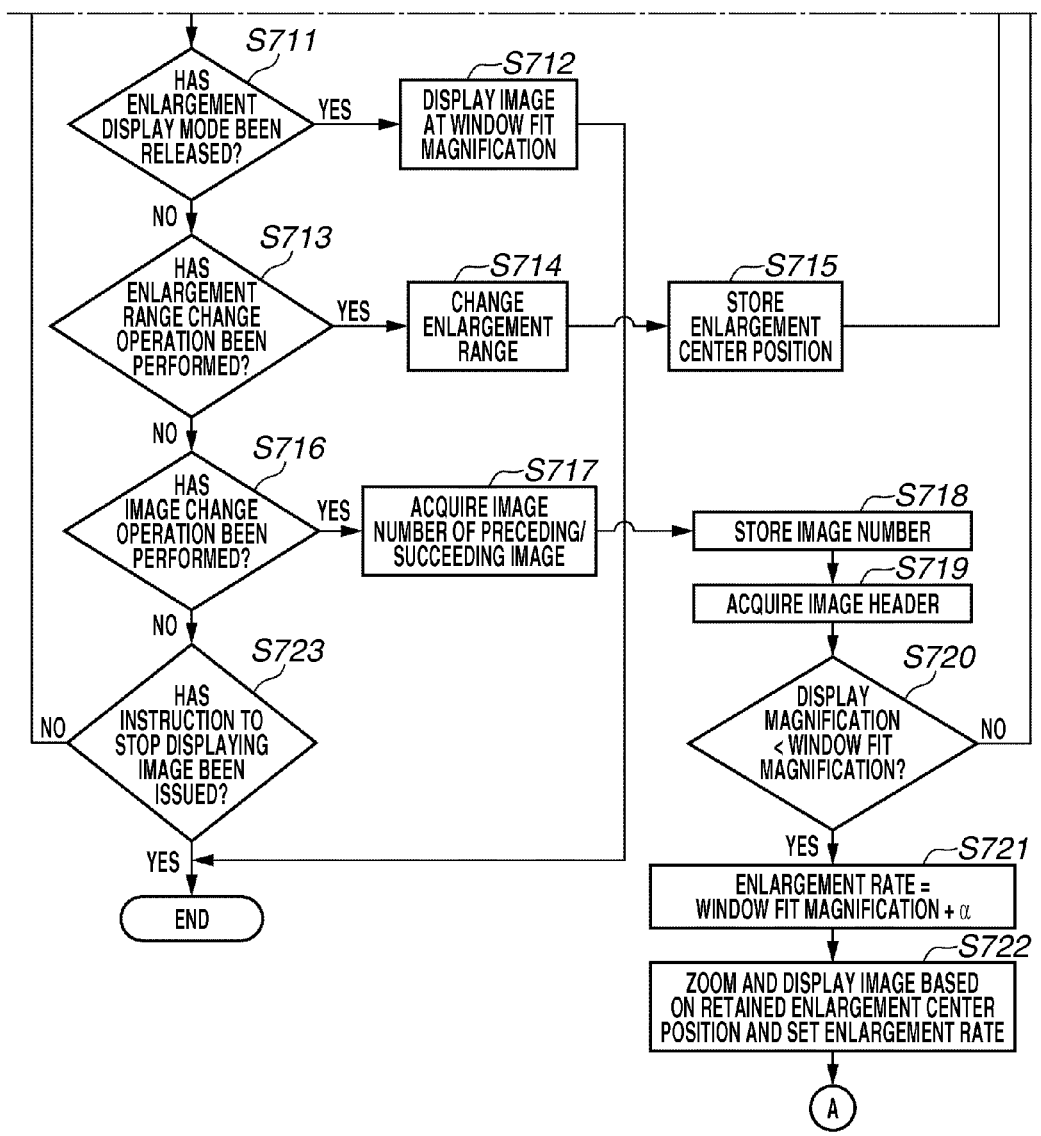

FIG. 7 is a flowchart illustrating the flow of processing in the image switching in the enlargement display mode in the present exemplary embodiment described in FIG. 6. The processing illustrated in FIG. 7 is implemented when a program recorded in the nonvolatile memory 103 is rasterized into the memory 102 and the CPU 101 executes the program.

When an operation for enlarging an image (an operation for the enlargement button 205, or a pinch operation) is performed from a state where the image is displayed in a single display mode, the processing illustrated in FIG. 7 starts.

In step S701, the CPU 101 reads out image data (an image file) from the recording medium 108, and acquires the read image data in the memory 102.

In step S702, the CPU 101 acquires an enlargement rate and an enlargement center position. The enlargement rate is represented by a magnification ratio from a reference magnification, and the enlargement center position is represented by coordinates on the image.

In first initial processing performed when the enlargement display mode starts, the enlargement rate is a value corresponding to the pinch operation or a magnification 1.2 defined in the step 1 out of the plurality of steps illustrated in FIG. 4A, which is recorded in the nonvolatile memory 103, if the operation for the enlargement button 205 is performed.

The enlargement center position in the initial processing is an image center position if the operation for the enlargement button 205 is performed, and central coordinates between two points of a touch operation if the pinch-out operation is performed. In processing other than the initial processing, the enlargement rate and the enlargement center position are values stored in the memory 102 by processing, which will be described below.

In step S703, the CPU 101 more enlarges the image than that displayed at the window fit magnification based on the enlargement rate and the enlargement center position, which have been acquired in step S702, and displays the enlarged image.

More specifically, the above-mentioned reference magnification is calculated based on the size of an original image obtained from attribute information (header information, etc.) of an image file to be displayed, and zooms the original image at "a reference magnification×a magnification ratio from the reference magnification (an enlargement rate)" (i.e., changes the magnification). A range falling within the display area 208 in the display 105 using coordinates of the enlargement center position as a center is displayed in the display area 208. Thus, the image is enlarged and displayed as illustrated in FIG. 6A, for example.

In step S704, the CPU 101 determines whether the enlargement button 205 has been pressed (a touch on the enlargement button 205, a click in a mouse operation, or a press of an operation button on a keyboard corresponding to the enlargement button 205 has been performed). If the enlargement button 205 has been pressed (YES in step S704), the processing proceeds to step S705. Otherwise (NO in step S704), the processing proceeds to step S706.

In step S705, the CPU 101 updates the current step number retained in the memory 102 to a number of a step in which a magnification ratio larger than the current magnification ratio and closest to a magnification ratio immediately before the press of the enlargement button 205 is defined, and acquires a magnification ratio from a reference magnification, which is defined in the step.

In step S706, the CPU 101 determines whether the reduction button 204 has been pressed (a touch on the reduction button 204, a click in a mouse operation, or a press of an operation button on a keyboard corresponding to the reduction button 204 has been performed). If the reduction button 204 has been pressed (YES in step S706), the processing proceeds to step S707. Otherwise (NO in step S706), the processing proceeds to step S708.

In step S707, the CPU 101 updates the current step number retained in the memory 102 to a number of a step in which a magnification ratio smaller than the current magnification ratio and closest to a magnification ratio immediately before the press of the reduction button 204 is defined, and acquires a magnification ratio from a reference magnification, which is defined in the step.

In step S708, the CPU 101 determines whether a manual zooming operation has been performed. This is a determination whether a zooming operation, which is not a zooming operation in units of steps such as in steps S704 and S706 described above, has been performed, and is a determination whether a pinch-in operation or a pinch-out operation has been performed in the present exemplary embodiment. If it is determined that the manual zooming operation has been performed (YES in step S708), the processing proceeds to step S709. Otherwise (NO in step S708), the processing proceeds to step S711.

In step S709, the CPU 101 determines a magnification ratio from a reference magnification depending on the manual zooming operation, and changes a magnification ratio before the manual zooming operation.

In step S710, the CPU 101 updates the enlargement rate so far retained in the memory 102, and stores the magnification ratio from the reference magnification, which has been acquired in step S705, S707, or S709, as an enlargement rate (magnification information) in the memory 102. When the processing in step S710 is performed, the processing proceeds to step S702. In step S702, the CPU 101 updates display so that the displayed image is enlarged or reduced based on the updated enlargement rate (magnification information). For example, the display state as illustrated in FIG. 6B is updated, and the display as illustrated in FIG. 6D in which the image 2 is enlarged is performed.

In step S711, the CPU 101 determines whether the enlargement display mode has been released. When a window fit magnification is selected from the pull-down menu in the display magnification display area 206, or an operation for reducing the image to that displayed at the window fit magnification by an operation for the reduction button 204 or a pinch-in operation is performed, the enlargement display mode is released. If the enlargement display mode is released (YES in step S711), the processing proceeds to step S712. Otherwise (NO in step S711), the processing proceeds to step S713.

In step S712, the CPU 101 displays the displayed image at the window fit magnification, and the enlargement display processing ends.

In step S713, the CPU 101 determines whether an enlargement-range change operation has been performed. The enlargement-range change operation can be performed by a drag operation using the touch panel or the mouse. Alternatively, the enlargement-range change operation may be able to be performed by pressing a direction button provided in the keyboard. When the enlargement-range change operation has been performed (YES in step S713), the processing proceeds to step S714. Otherwise (NO in step S713), the processing proceeds to step S716.

In step S714, the CPU 101 changes a range of an image to be displayed in the enlargement display mode depending on the enlargement-range change operation. In step S715, the CPU 101 then stores (updates) a center position of a changed enlargement range (display range) as an enlargement center position in the memory 102.

In step S716, the CPU 101 determines whether an image switching or image return operation (an image change operation) has been performed. If the image return button 202 or the image switching button 203 is pressed, it is determined that the image change operation has been performed (YES in step S716), and the processing proceeds to step S717. Otherwise (NO in step S716), the processing proceeds to step S723.

In step S717, the CPU 101 acquires an image number (a file identifier) of an image preceding the currently displayed image in a predetermined order in image switching if image return is performed in response to the image change operation that has been received in step S716. The CPU 101 acquires an image number of an image succeeding the currently displayed image in a predetermined order if image switching is performed in response to the image change operation that has been received in step S716.

In step S718, the CPU 101 stores the acquired image number in the memory 102.

In step S719, the CPU 101 reads header information of an image to be subsequently displayed based on the image number that has been stored in step S718, i.e., the image number of the image to be subsequently displayed, and acquires the read header information in the memory 102. The header information of the image includes information about the size of the original image of the image. In the processing, the size of the original image of the image need not necessarily be acquired from the header information of the image as long as it can be acquired.

In step S720, the CPU 101 calculates a window fit magnification of an image to be displayed based on the size information of the original image that has been acquired in step S719. Further, the CPU 101 calculates a display magnification (i.e., a reference magnification×an enlargement rate) of the image to be displayed, which is to be calculated based on the enlargement rate retained in the memory 102. The CPU 101 determines whether the display magnification is smaller than the window fit magnification.

If the display magnification is not smaller than the window fit magnification (i.e., the display magnification is the window fit magnification or more) (NO in step S720), the processing proceeds to step S701. In step S701, the CPU 101 reads out data representing the original image of the image to be displayed, which is represented by the image number that has been stored in step S718. In step S702 and the subsequent steps, the CPU 101 performs image return/image switching in the enlargement display mode based on the enlargement rate and the enlargement center position that are retained in the memory 102.

If the retained enlargement rate is thus the window fit magnification or more of the image after the image switching, the image after the image switching is displayed at the same enlargement rate as the enlargement rate of the image before the image switching (the enlargement rate is an enlargement rate from a reference magnification).

Strictly speaking, the image after the image switching is not necessarily displayed at the same enlargement rate as that of the image displayed immediately before the image switching, and is displayed at the same enlargement rate as that of the image displayed when the enlargement rate has been finally updated in step S710 before the image switching. Thus, image switching in which the enlargement rate is retained as illustrated from FIG. 6D to FIG. 6E is performed, for example. Alternatively, an image display state (FIG. 6B) at an enlargement rate different from the enlargement rate retained in the memory 102 in FIG. 6A is switched to an image display state (FIG. 6C) at the enlargement rate retained in the memory 102, as illustrated from FIG. 6B to FIG. 6C.

On the other hand, if it is determined that the display magnification is smaller than the window fit magnification (YES in step S720), the processing proceeds to step S721. In step S721, the CPU 101 sets the enlargement rate of the image to be displayed, which is represented by the image number stored in step S718, to a predetermined magnification that is the window fit magnification (represented by a magnification ratio from a reference magnification) or more. For example, the enlargement rate is set to 1.2 times that is defined in step 1 illustrated in FIG. 4A (is larger than the window fit magnification).

The set enlargement rate is thus applied to only the image to be displayed, the display magnification of which is determined to be smaller than the window fit magnification in step S720, and the enlargement rate, which is retained in the memory 102 in step S710, is retained without being updated.

In step S722, the CPU 101 zooms and displays the image to be displayed based on the enlargement center position retained in the memory 102 and the enlargement rate set in step S721. Thus, the image switching illustrated from FIG. 6A to FIG. 6B, for example, is performed. If the processing in step S722 is performed, the processing proceeds to step S704.

On the other hand, in step S723, the CPU 101 determines whether an instruction to stop displaying the image has been issued. The instruction to stop displaying the image is issued by a press of the end button 207, an operation for turning off power, or an operation for transition to another operation mode. If the instruction to stop displaying the image has not been issued (NO in step S723), the processing returns to step S704. In step S704 and the subsequent steps, the processing is repeated. If the instruction to stop displaying the image has been issued (YES in step S723), the display of the displayed image ends, and the enlargement display processing ends.

By the foregoing processing, the enlarged image switching in screen transition as illustrated in FIG. 6, is performed. Therefore, the user is not given an uncomfortable feeling in the image switching in the enlargement display mode.

One piece of hardware may perform the control in the CPU 101 as described above, or a plurality of pieces of hardware may perform control of the entire apparatus by sharing the processing.

While the present invention has been described in detail based on its exemplary embodiment, it is to be understood that the present invention is not limited to the specific exemplary embodiment. Various modifications and changes may be made without departing from the scope of the present invention, and moreover the present invention may be implemented in a wide variety of additional manners.

While a case where the present invention is applied to a personal computer (PC) is taken as an example in the above-mentioned exemplary embodiment, the present invention is not limited to this example. The present invention is applicable to a display control apparatus capable of performing display for performing image switching while an image remains enlarged. More specifically, the present invention is applicable to a personal computer, personal digital assistants (PDA), a mobile phone terminal, a portable image viewer, a printer including a display, a digital photo frame, a music player, a game machine, an electronic book reader, and an imaging apparatus such as a digital camera.

Particularly, the present invention is effectively applied to an imaging apparatus including an imaging unit. In the imaging apparatus, the same positions of a plurality of images captured by continuous shooting significantly need to be enlarged and compared to confirm which of the images is most in focus as intended, for example. Therefore, the present invention is particularly appropriately applied thereto.

As described above, the present invention is also appropriate for a case where the same object is captured by vertically holding or horizontally holding a camera or changing the number of recording pixels. According to the above-mentioned enlargement display processing, display sizes of the same object can be the same when displayed, because image switching in which the enlargement rate from the reference magnification is retained as long as it is not below the window fit magnification is performed.

A display, which displays a captured image, in the imaging apparatus is miniaturized as the imaging apparatus is miniaturized. Therefore, the image is particularly required to be able to be enlarged and displayed. If the present invention is applied to the imaging apparatus, each of the operations described in the above-mentioned exemplary embodiment can be replaced as described below, for example:

the operation of the image return button 202/the image switching button 203—a press of an image return button (e.g., a left button)/an image switching button (e.g., a right button) in the imaging apparatus the operation of the reduction button 204/the enlargement button 205—an operation toward a wide-angle side/an operation toward a telephoto side of a zoom lever in the imaging apparatus or an operation for a reduction button/an enlargement button in the imaging apparatus the pinch-in/the pinch-out (the manual zooming operation)—pinch-in/pinch-out for a touch panel provided in an image display monitor of the imaging apparatus Aspects of the present invention can also be realized by a computer of a system or apparatus (or devices such as a CPU or MPU) that reads out and executes a program recorded on a memory device (computer-readable medium) to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A display control apparatus comprising:
  a memory; and
  at least one processor, the memory storing a program of instructions executable by the at least one processor, and the at least one processor executes the program of instructions to implement:
    changing a display magnification of an image displayed on a display unit based on an operation performed by a user;
    receiving a switching instruction to switch an image displayed on the display unit to another image; and
    performing control, when a first image is switched to a second image:
      to display the second image at a display magnification according to whether a first display magnification based on a display magnification at which the first image is displayed before a switch to the second image is smaller than a fit magnification,
      to display the second image at a second display magnification that is at least the fit magnification if the first display magnification is smaller than the fit magnification, and
      to display the second image at the first display magnification if the first display magnification is larger than the fit magnification,
    wherein the fit magnification is one of a magnification at which the length of the second image matches the length of the display area and a magnification at which the width of the second image matches the width of the display area.

2. The display control apparatus according to claim 1, wherein the at least one processor executes the program of instructions to implement storing magnification information representing the display magnification of the image that has been changed by the changing,
  wherein the first display magnification is determined based on the magnification information stored by the storing.

3. The display control apparatus according to claim 2, wherein the storing is responsive to the displayed image being switched in response to the switching instruction for not updating the magnification information.

4. The display control apparatus according to claim 2, wherein the magnification information stored by the storing when the first image is switched to the second image is information representing the display magnification of the displayed first image when the changing changes the display magnification of the displayed first image.

5. The display control apparatus according to claim 1, wherein the at least one processor executes the program of instructions to implement receiving a first operation for gradually switching the display magnification of the displayed image out of a plurality of predetermined magnifications and receiving a second operation for changing the display magnification of the displayed image in a finer unit than that used for the first operation,
  wherein the changing changes the display magnification of the image based on the first operation and the second operation.

6. The display control apparatus according to claim 5, wherein the second display magnification is an initial magnification that is to be increased by the first operation from a state that the image is displayed in the maximum size falling within the display area, among the plurality of predetermined magnifications.

7. The display control apparatus according to claim 5, wherein the changing changes, when the image is displayed in the maximum size falling within the display area, the display magnification of the displayed image so that the display magnification becomes larger than a display magnification at which the long side of the displayed image matches the long side of the display area when the first operation indicates an enlargement operation once.

8. The display control apparatus according to claim 5, wherein the at least one processor executes the program of instructions to implement detecting a touch operation for the display unit,
  wherein the second operation indicates a pinch-out operation or a pinch-in operation in which a distance between touch positions at two points detected by the detecting changes as an operation for changing the display magnification of the displayed image in a finer unit than that used for the first operation.

9. The display control apparatus according to claim 1, wherein the second display magnification is larger than the fit magnification.

10. The display control apparatus according to claim 2, wherein the magnification information is information representing a magnification ratio from a reference magnification serving as a display magnification at which the long side of the image matches the long side of the display area.

11. The display control apparatus according to claim 1, wherein the performing control is implemented by an imaging apparatus including an imaging unit and a display unit capable of displaying an image captured by the imaging unit.

12. The display control apparatus according to claim 1, wherein the fit magnification is a magnification for making the image have the maximum size falling within the display area.

13. The display control apparatus according to claim 1, wherein the performing control is responsive to receiving of a switching instruction to switch the second image to a third image by the receiving without changing the display magnification by the changing while the second image is displayed for performing control to display the third image at the first display magnification regardless of the display magnification at which the second image has been displayed if the first display magnification is larger than a fit magnification of the third image.

14. A control method comprising:
  changing a display magnification of an image displayed on a display unit based on an operation performed by a user;
  receiving a switching instruction to switch an image displayed on the display unit to another image; and
  performing control, when a first image is switched to a second image:
    to display the second image at a display magnification according to whether a first display magnification based on a display magnification at which the first image is displayed before a switch to the second image is smaller than a fit magnification, to display the second image at a second display magnification that is at least the fit magnification if the first display magnification is smaller than the fit magnification, and to display the second image at the first display magnification if the first display magnification is larger than the fit magnification, wherein the fit magnification is one of a magnification at which the length of the second image matches the length of the display area and a magnification at which the width of the second image matches the width of the display area.

15. A non-transitory computer-readable storage medium storing a program capable of causing a computer to perform a control method, the control method comprising:

changing a display magnification of an image displayed on a display unit based on an operation performed by a user;

receiving a switching instruction to switch an image displayed on the display unit to another image; and performing control, when a first image is switched to a second image:

to display the second image at a display magnification according to whether a first display magnification based on a display magnification at which the first image is displayed before a switch to the second image is smaller than a fit magnification, to display the second image at a second display magnification that is at least the fit magnification if the first display magnification is smaller than the fit magnification, and to display the second image at the first display magnification if the first display magnification is larger than the fit magnification, wherein the fit magnification is one of a magnification at which the length of the second image matches the length of the display area and a magnification at which the width of the second image matches the width of the display area.

* * * * *